US00RE43997E

(19) United States
(12) Reissued Patent
Stahl, Sr.

(10) Patent Number: US RE43,997 E
(45) Date of Reissued Patent: Feb. 19, 2013

(54) INTUMESCENT FIRESTOPPING APPARATUS

(75) Inventor: James P. Stahl, Sr., Stockton, NJ (US)

(73) Assignee: Specified Technologies Inc., Somerville, NJ (US)

(21) Appl. No.: 11/265,743

(22) Filed: Nov. 2, 2005

Related U.S. Patent Documents

Reissue of:
(64) Patent No.: 6,732,481
Issued: May 11, 2004
Appl. No.: 10/202,055
Filed: Jul. 24, 2002

(51) Int. Cl.

| | |
|---|---|
| ***E04B 1/74*** | (2006.01) |
| ***A62C 2/00*** | (2006.01) |
| ***A62C 2/06*** | (2006.01) |
| ***F16L 5/02*** | (2006.01) |
| ***F16L 5/04*** | (2006.01) |
| ***H02G 3/04*** | (2006.01) |

(52) U.S. Cl. ..... 52/406.1; 52/232; 52/741.3; 52/220.1; 52/220.8; 52/317

(58) Field of Classification Search ..... 52/232, 52/741.3, 741.4, 742.12, 1, 220.8; 174/483
See application file for complete search history.

(56) References Cited

U.S. PATENT DOCUMENTS

| | | | | | |
|---|---|---|---|---|---|
| 4,109,423 | A | * | 8/1978 | Perrain | 52/1 |
| 4,243,835 | A | | 1/1981 | Ehrenfels | |
| 4,245,445 | A | * | 1/1981 | Heinen | 52/220.8 |
| 4,249,353 | A | * | 2/1981 | Berry | 52/232 |
| 4,264,779 | A | | 4/1981 | Rhodes et al. | |
| 4,276,332 | A | * | 6/1981 | Castle | 428/34.1 |
| 4,302,917 | A | * | 12/1981 | Fermvik et al. | 52/220.8 |
| 4,304,079 | A | * | 12/1981 | Thorsten | 174/48 |
| 4,336,416 | A | | 6/1982 | Goodsell | |
| 4,363,199 | A | | 12/1982 | Kucheria et al. | |
| 4,400,920 | A | | 8/1983 | Logsdon | |
| 4,419,535 | A | * | 12/1983 | O'Hara | 174/48 |
| 4,467,577 | A | | 8/1984 | Licht | |
| 4,477,694 | A | | 10/1984 | Kohaut | |
| 4,493,173 | A | * | 1/1985 | Kohaut | 52/220.8 |
| 4,566,242 | A | * | 1/1986 | Dunsworth | 52/396.01 |
| 4,646,486 | A | | 3/1987 | Hauff | |
| RE32,678 | E | | 5/1988 | Benscoter et al. | |
| 4,796,401 | A | * | 1/1989 | Wexler | 52/232 |
| 4,800,926 | A | | 1/1989 | Beck | |
| 4,894,966 | A | * | 1/1990 | Bailey et al. | 52/317 |
| 4,901,488 | A | * | 2/1990 | Murota et al. | 52/232 |
| 5,032,690 | A | | 7/1991 | Bloom | |

(Continued)

FOREIGN PATENT DOCUMENTS

| | | | | | |
|---|---|---|---|---|---|
| JP | 03144039 | A | * | 6/1991 | 52/232 |

*Primary Examiner* — Basil Katcheves
(74) *Attorney, Agent, or Firm* — Sperry, Zoda & Kane

(57) ABSTRACT

An intumescent firestopping apparatus used in poke-through applications for selectively sealing an opening through a construction barrier such as a wall, floor or ceiling having cables or other penetrating members extending therethrough. The apparatus effectively seals this barrier responsive to a fire to prevent unwanted transmission of fire through conventional construction barrier areas. The apparatus includes a sleeve with two intumescent pads positioned therein. At least one of the pads has an arcuate curved central section to be biased against the other intumescent pad to define therebetween a confinement area for holding of cables centrally located therein in a dynamically adjustable sealing throat defined therebetween. These pads can be variously mounted with respect to the adjacent wall structures and one or both of the pads can be arched toward the other pad to facilitate defining of the dynamic throat for receiving cables extending therethrough.

36 Claims, 4 Drawing Sheets

U.S. PATENT DOCUMENTS 5,067,676 A * 11/1991 Beele ..... 248/56
5,099,625 A * 3/1992 Staudt ..... 52/232
5,121,594 A 6/1992 Wuertz
5,132,054 A 7/1992 Stahl
5,137,658 A 8/1992 Stahl
5,174,077 A 12/1992 Murota
5,220,131 A 6/1993 Wuertz
5,237,128 A 8/1993 Wuertz
5,272,278 A 12/1993 Wuertz
5,393,930 A 2/1995 Wuertz
5,410,103 A 4/1995 Wuertz
5,421,127 A 6/1995 Stefely
5,452,551 A 9/1995 Charland et al.
5,456,050 A 10/1995 Ward
5,467,565 A 11/1995 Bowman et al.
5,594,202 A 1/1997 Tobias
5,641,940 A 6/1997 Whitehead
5,661,891 A 9/1997 Miller et al.
5,696,349 A 12/1997 Bera
5,729,938 A 3/1998 Tobias
5,740,698 A 4/1998 Myronuk et al.
5,747,732 A 5/1998 Bera et al.
5,814,764 A 9/1998 Kohaut
5,830,319 A * 11/1998 Landin ..... 162/159
5,953,872 A 9/1999 MacMillian et al.
5,974,750 A * 11/1999 Landin et al. ..... 52/396.01
6,018,126 A 1/2000 Castellani et al.
6,112,488 A * 9/2000 Olson et al. ..... 52/393
6,114,623 A 9/2000 Bonilla et al.
6,141,915 A 11/2000 Andersen et al.
6,153,668 A * 11/2000 Gestner et al. ..... 523/179
6,158,180 A 12/2000 Edwards
6,175,078 B1 1/2001 Bambardekar et al.
6,176,052 B1 * 1/2001 Takahashi ..... 52/232
6,180,882 B1 1/2001 Dinh
6,307,152 B1 10/2001 Bonilla et al.
6,353,180 B1 3/2002 DeBartolo, Jr. et al.
6,360,502 B1 3/2002 Stahl, Jr.
6,536,169 B2 3/2003 Dykhoff
2002/0032996 A1 3/2002 Cornwall

* cited by examiner

INTUMESCENT FIRESTOPPING APPARATUS

Matter enclosed in heavy brackets [ ] appears in the original patent but forms no part of this reissue specification; matter printed in italics indicates the additions made by reissue.

*Notice: The present application is Ser. No. 11/265,743 originally submitted Nov. 2, 2005 as a reissue patent application related to U.S. Pat. No. 6,732,481 issued May 11, 2004. More than one reissue application has been filed for the reissue of U.S. Pat. No. 6,732,481. The reissue applications are the present application and application Ser. No. 11/642,939 filed Nov. 2, 2005, all of which are divisional applications for reissue of U.S. Pat. No. 6,732,481.*

BACKGROUND OF THE INVENTION

1. Field Of The Invention

The present invention deals with the field of firestopping designs particularly and more particularly deals with intumescent firestopping materials which are designed to expand rapidly responsive to fire and heat for the purpose of sealing openings which need to be placed within the walls, ceilings, floors and other construction barriers of conventional residential and/or commercial buildings. It is difficult to provide the correct amount of intumescent material while at the same time allowing retrofitting and refitting of the cables or other penetrating members which must extend through these construction openings. The present invention provides a dynamically adjustable sealing system which defines a throat through which cables can extend and which throat has a confinement area for holding the cables while at the same time facilitating intumescent sealing of the entire opening responsive to a fire and heat condition.

2. Description Of The Prior Art

Numerous patents have been designed for the purpose of using intumescent materials for sealing openings in construction barriers such as walls, floors and ceilings such as shown in U.S. Pat. No. 4,243,835 issued Jan. 6, 1981 to A. Ehrenfels and assigned to Harvey Hubbell, Incorporated on a "Non-Rigid Mechanical Coupling For A Fire-Rated Feed-Through Fitting And Method Of Making"; and U.S. Pat. No. 4,264,779 issued Apr. 28, 1981 to T. R. Rhodes et al and assigned to General Signal Corporation on a "Poke-Through Electrical Fitting With Releasable Wedging Point For Retention"; and U.S. Pat. No. 4,336,416 issued Jun. 22, 1982 to J. P Goodsell and assigned to Harvey Hubbell Incorporated on a "Fire-Rated Feed-Through Fitting For Transferring Insulated Wires Through A Concrete Floor"; and U.S. Pat. No. 4,363,199 issued Dec. 14, 1982 to C. S. Kucheria et al and assigned to Kennecott Corporation on a "Fire Resistant Sealing System For Holes In Fire Resistant Building Partitions"; and U.S. Pat. No. 4,400,920 issued Aug. 30, 1983 to D. D. Logsdon on an "Apparatus For Securing Pipe"; and U.S. Pat. No. 4,467,577 issued Aug. 28, 1984 to R. R. Licht and assigned to Minnesota Mining and Manufacturing Company on an "Intumescent Fire Barrier Material Laminated With Restraining Layer"; and U.S. Pat. No. 4,477,694 issued Oct. 16, 1984 to J. E. Kohaut and assigned to John E. Kohaut and Raceway Components, Inc. on a "Through-Floor Electrical Outlet Fitting"; and U.S. Pat. No. 4,646,486 patented Mar. 3, 1987 to W. Hauff on a "Flame-Retarding Wall Feedthrough Fitting"; and U.S. Reissue Pat. No. Re.32,678 issued May 31, 1988 to R. D. Benscoter et al and assigned to Butler Manufacturing Company on an "Economy Poke-Thru"; and U.S. Pat. No. 4,800,926 issued Jan. 31, 1989 to P. C. Beck and assigned to Adolph Coors Company on a "Firebreak For Conduits"; and U.S. Pat. No. 5,032,690 issued Jul. 16, 1991 to M. Bloom and assigned to Masco Building Products Corp. on a "Poke-Through Connector Assembly"; and U.S. Pat. No. 5,121,594 issued Jun. 16, 1992 to E. S. Wuertz and assigned to Hubbell Incorporated on a "Method For Attaching A Poke-Through Electrical Fitting"; and U.S. Pat. No. 5,132,054 issued Jul. 21, 1992 to J. Stahl and assigned to Specified Technologies Inc. on a "Composition Of Matter For A Fire Retardant Intumescent Material Having Two Stages Of Expansion And A Process For Making Thereof"; and U.S. Pat. No. 5,137,658 issued Aug. 11, 1992 to J. Stahl and assigned to Specified Technologies Inc. on a "Process For Forming A Fire Retardant Intumescent Material Having Two Stages Of Expansion"; and U.S. Pat. No. 5,174,077 issued Dec. 29, 1992 to G. Murota and assigned to The Furukawa Electric Co., Ltd. on a "Fire Protecting Structure Of Channel Portion Of Plastic Piping In A Fire Partition"; and U.S. Pat. No. 5,220,131 issued Jun. 15, 1993 to E. S. Wuertz and assigned to Hubbell Incorporated on a "Poke-Through Fire Barrier Structure With Knock-Out Openings"; and U.S. Pat. No. 5,237,128 issued Aug. 17, 1993 to E. S. Wuertz and assigned to Hubbell Incorporated on an "Above-Floor Service Fitting For Poke-Through Wiring Device"; and U.S. Pat. No. 5,272,278 issued Dec. 21, 1993 to E. S. Wuertz and assigned to Hubbell Incorporated on a "Poke-Through Wiring Fitting With Flap Cover Assembly"; and U.S. Pat. No. 5,5,393,930 issued Feb. 28, 1995 to E. S. Wuertz and assigned to Hubbell Incorporated on a "Self-Anchoring Poke-Through Wiring Device"; and U.S. Pat. No. 5,410,103 issued Apr. 25, 1995 to E. S. Wuertz and assigned to Hubbell Incorporated on a "Self-Anchoring Poke-Through Wiring Device"; and U.S. Pat. No. 5,421,127 issued Jun. 6, 1995 to S. F. Stefely on a "Fire Stop Closure"; and U.S. Pat. No. 5,452,551 issued Sep. 26, 1995 to P. J. Charland et al and assigned to Minnesota Mining and Manufacturing Company on a "Tiered Firestop Assembly"; and U.S. Pat. No. 5,456,050 issued Oct. 10, 1995 to T. T. Ward and assigned to Construction Consultants & Contractors, Inc. on a "System To Prevent Spread Of Fire And Smoke Through Wall-Breaching Utility Holes"; and U.S. Pat. No. 5,467,565 issued Nov. 21, 1995 to T. Bowman et al and assigned to Walker Systems, Inc. on a "Method And Apparatus For Improved Activation Of Services In An Office Building Floor"; and U.S. Pat. No. 5,594,202 issued Jan. 14, 1997 to M. A. Tobias on a "Split Sleeve System"; and U.S. Pat. No. 5,641,940 issued to J. H. Whitehead on Jun. 24, 1997 and assigned to Thomas & Betts Corporation on a "Poke-Through Electrical Connection Assembly Retainer"; and U.S. Pat. No. 5,661,891 issued Sep. 2, 1997 to A. J. Miller et al on a "Method Of Passing Wires Through A Firewall Using Telescoping Conduit Assembly"; and U.S. Pat. No. 5,696,349 issued Dec. 9, 1997 to J. Bera and assigned to Raceway Components, Inc. on a "Wedge-Lockable Fire-Retardant Poke-Through Service Fitting"; and U.S. Pat. No. 5,729,938 issued Mar. 24, 1998 to M. A. Tobias on a "Wall Penetrator Sleeve System"; and U.S. Pat. No. 5,740,698 issued Apr. 21, 1998 to D. J. Myronuk et al on a "Flame Attenuator For Poke-Through Constructions"; and U.S. Pat. No. 5,747,732 issued May 5, 1998 to J. Bera et al and assigned to Raceway Components, Inc. on a "Fire-Rated Furniture Feed Poke-Through Fitting"; and U.S. Pat. No. 5,814,764 issued Sep. 29, 1998 to J. E. Kohaut and assigned to Raceway Components, Inc. on an "Insert For Poke-Through Fitting"; and U.S. Pat. No. 5,953,872 issued Sep. 21, 1999 to G. S. MacMillian et al on a "Fire Barrier Assembly"; and U.S. Pat. No. 6,018,126 issued Jan. 25, 2000 to N. Castellani et al and assigned to Walker Systems, Inc. on a "Flush Poke-Through Wiring Fitting"; and U.S. Pat. No. 6,114,623 issued Sep. 5, 2000 to N. Bonilla et al and assigned to Hubbell Incorporated on a "Poke-Through Floor Fitting"; and U.S. Pat. No. 6,141,915 issued Nov. 7, 2000 to t. Andersen et al on a "Fire Resistant Bushing For Cables, Pipes And Channels"; and U.S. Pat. No. 6,158,180 issued Dec. 12, 2000 to J. R. Edwards and assigned to Office Specialty Inc. on a "Mounting Device For Communications Conduit Connector"; and U.S. Pat. No. 6,175,078 issued Jan. 16, 2001 to S. S. Bambardekar and assigned to Walker Systems, Inc. on a "Flush Poke-Through Wiring Fitting Having A Height Adjustable Data Jack Mounting Bracket"; and U.S. Pat. No. 6,176,052 issued Jan. 23, 2001 to J. Takahashi and assigned to Tosetz Co., Ltd. on a "Fire Retarding Division Penetrating Member"; and U.S. Pat. No. 6,180,882 issued Jan. 30, 2001 to C. T. Dinh and assigned to Thomas & Betts, International on a "Single And Dual Cable Seal System"; and U.S. Pat. No. 6,307,152 issued Oct. 23, 2001 to N. Bonilla et al and assigned to Hubbell Incorporated on a "Poke-Through Floor Fitting"; and U.S. Pat. No. 6,353,180 issued Mar. 5, 2002 to J. V. DeBartolo, Jr. et al and assigned to Hubbell Incorporated on "Bus Bars For Poke-Through Floor Fitting"; and U.S. Pat. No. 6,360,502 issued Mar. 26, 2002 to J. P. Stahl, Jr. and assigned to Specified Technologies Inc. on a "Firestop Collar Means With Improved Mounting Means"; and United States Publication No. U.S. 2002/0032996 A1 published to K. R. Cornwall on Mar. 21, 2002 on a "Coupling Assembly With Intumescent Material".

SUMMARY OF THE INVENTION

The present invention provides an intumescent firestopping apparatus for the purpose of fire sealing of openings in construction barriers such as walls, floors and ceilings which are normally included in the construction barriers in order to allow penetrating members such as wires and cables to extend therethrough. The configuration includes a sleeve which is securable to the construction barrier at a position extending through the opening defined therein for the purpose of defining an access corridor extending completely through the barrier itself. This sleeve preferably will include flat outer sections to facilitate placing of a plurality of sleeve means adjacent to one another thereby facilitating usage of the apparatus of the present invention for sealing of openings in construction barriers which are significantly larger than a single sleeve itself.

The sleeve design of the present invention includes an upper wall member which extends completely through the barrier and a lower wall member which also extends completely through the barrier and is spatially disposed below the upper wall member to facilitate defining of the access corridor in the area therebetween.

A first side wall member will extend completely through the barrier and will extend from the upper wall member downwardly to the lower wall member. Additionally a second side wall member will extend completely through the barrier from the upper wall member downwardly to the lower wall member at a position spatially disposed from the first side wall member to facilitate defining of the access corridor therebetween. This access corridor will allow the placement of penetrating members such as cables therethrough. The sleeve is also preferably of a rectangular shape with the upper wall member and the lower wall member oriented parallel with respect to one another and the first side wall member and the second side wall member parallel with respect to one another and oriented perpendicularly with respect to the upper and lower wall members. An upper tab means will be included extending downwardly from the upper wall member for holding of an intumescent pad therein. Similarly a lower tab will extend upwardly from the lower wall member to facilitate holding of an intumescent pad thereadjacent.

A lower intumescent pad may be included positioned within the access corridor extending at least partially along the lower wall member. This lower intumescent pad will be in abutment with respect to the lower tab to facilitate attachment thereof with respect to the sleeve. The lower intumescent pad preferably will include a lower central pad section. This pad section preferably is of a flexibly resilient material such as to extend upwardly from the lower wall. Furthermore the lower central pad section will define a lower slot configuration which can include a plurality of slots extending longitudinally therein to facilitate the flexible resilience thereof.

An upper intumescent pad is also defined extending at least partially along the upper wall member. The upper intumescent pad preferably includes an upper central pad section which is flexibly resilient and extends downwardly from the upper wall toward the lower central pad section of the lower intumescent pad therebelow in such a manner as to define a confinement area therebetween. This confinement area is for the purpose of holding cables or other penetrating members extending therethrough by exerting a force thereon. In this manner the present invention will define a dynamically adjustable sealing throat for receiving and retaining said cables which is cable of use with many different cable sizes and can be used with various numbers of cables as well as being capable of retrofitting for changes in the number or size of such cables.

The upper central pad section preferably also defines an upper slot extending longitudinally therein for the purpose of facilitating flexible resilience of the upper central pad section. This upper intumescent pad will be in abutment with respect to the upper tab in order to facilitate attachment thereof with respect to the sleeve. The upper intumescent pad and the lower intumescent pad will preferably have sufficient intumescent expansion capability to seal the entire cross-sectional area of the access corridor responsive to a fire or heat condition.

The present invention preferably will also include a first upper restraining support positioned extending laterally from the first side wall member and the second side wall member. Also included preferably will be a second upper restraining support positioned laterally from the first side wall member and the second side wall member at a position spatially disposed from the first upper restraining support. The first upper restraining support and the second upper restraining support will both be spaced away from the upper wall member in order to define an upper restraining space therebetween to retain the upper intumescent pad therewithin. In one preferred configuration, the restraining supports will comprise tabs of the material, preferably a metal, of the sleeve itself punched out on three sides and projecting inwardly to provide supporting plates to facilitate holding of the pads in place. The upper central pad section of the upper intumescent pad is preferably positioned between the first upper restraining support and the second upper restraining support to facilitate extending downwardly therebetween toward the lower intumescent pad positioned therebelow.

A first lower restraining support may also be included positioned extending laterally from the first side wall member and the second side wall member. Additionally a second lower restraining support may also be included positioned extending laterally from the first and second side wall members at a position spatially disposed from the first lower restraining support. In this manner the first and second lower restraining supports will both be spaced away from the lower wall member thereadjacent in order to define a lower restraining space therebetween to retain the lower intumescent pad therein. The lower central pad section of the lower intumescent pad is preferably positioned between the first lower restraining support and the second lower restraining support in order to facilitate extending upwardly therebetween toward the upper intumescent pad positioned thereabove which is made possible by the flexible resilience of the central pad section of the lower intumescent pad.

The present invention may also include an upper biasing means such as an upper flat spring which can be positioned between the first upper restraining support and the second upper restraining support and also positioned between the upper wall member and the upper intumescent pad for the purpose of exerting downwardly directed bias against the upper intumescent pad to facilitate engagement thereof with respect to the penetrating members extending through the opening for enhancing retaining thereof. In a similar manner a lower biasing means such as a lower flat spring can be included positioned between the first lower restraining support and the second lower restraining support and also positioned between the lower wall member and the lower intumescent pad in order to exert upwardly directed bias against the lower intumescent pad to facilitate engagement thereof with respect to the penetrating members extending through the opening for enhancing retaining thereof.

It is an object of the intumescent firestopping apparatus of the present invention to selectively seal a wall, ceiling or floor construction opening responsive to fire and/or heat to prevent fire transfer therethrough and smoke traveling therethrough.

It is an object of the intumescent firestopping apparatus of the present invention which defines a dynamically adjustable sealing throat for receiving penetrating cables extending through a construction barrier opening.

It is an object of the intumescent firestopping apparatus of the present invention which includes two intumescent pads at least one of which is flexible resilient and is positioned adjacent to the other pad to define therebetween a confinement area for holding cables extending through construction barrier openings.

It is an object of the intumescent firestopping apparatus of the present invention which can include two intumescent pads both of which are flexibly resilient and extend toward one another to define a throat for dynamically adjustably receiving of cables therethrough and facilitating sealing thereof responsive to the presence of heat and/or smoke.

It is an object of the intumescent firestopping apparatus of the present invention which provides a sleeve-like portal for receiving cables and other electrical lines extending therethrough while effectively sealing same responsive to the presence of heat or fire in the adjacent area.

It is an object of the intumescent firestopping apparatus of the present invention which can be retrofitted with a different number of cables or cables of different sizes or other penetrating members while still maintaining full intumescent sealing capabilities.

It is an object of the intumescent firestopping apparatus of the present invention which can be effectively used for both vertical barriers such as walls and horizontal barriers such as ceilings and floors.

It is an object of the intumescent firestopping apparatus of the present invention which can be stacked as needed to fill large construction portals.

It is an object of the intumescent firestopping apparatus of the present invention which may include intumescent foam pads which have slits defined in the central portion thereof in order to facilitate flexible resilience thereof.

It is an object of the intumescent firestopping apparatus of the present invention which can be usable with intumescent foam pads wherein the foam may comprise polyurethane, silicone or any other polymer capable of being formed into a soft resilient foam.

It is an object of the intumescent firestopping apparatus of the present invention which utilizes intumescent materials such as graphite, sodium silicate or other commonly used expansion ingredient components in the intumescent pads themselves.

It is an object of the intumescent firestopping apparatus of the present invention which include firestopping materials which occupy their own space within the portal and do not displace cables.

It is an object of the intumescent firestopping apparatus of the present invention which allows the amount of firestopping material to remain in a constant state and are not removed nor displaced from the sleeve when retrofitted by adding or removal of cables.

It is an object of the intumescent firestopping apparatus of the present invention which include a sufficient amount of intumescent capability sufficient to seal the sleeve when it is empty or filled to capacity or filled to any intermediate level therebetween.

It is an object of the intumescent firestopping apparatus of the present invention which is permanent and designed to permit the installation or removal of cables or other similar penetrating members without requiring removal or re-installing of the firestopping components.

It is an object of the intumescent firestopping apparatus of the present invention which provides a smoke seal capable of sealing off most of the opening without requiring manual installation nor manipulation of the seal whatsoever.

It is an object of the intumescent firestopping apparatus of the present invention which provides intumescent activity both below and above the penetrating cables such that a cable bundle cannot be displaced due to downward movement thereof from the weight of the cables.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

Figure 1:
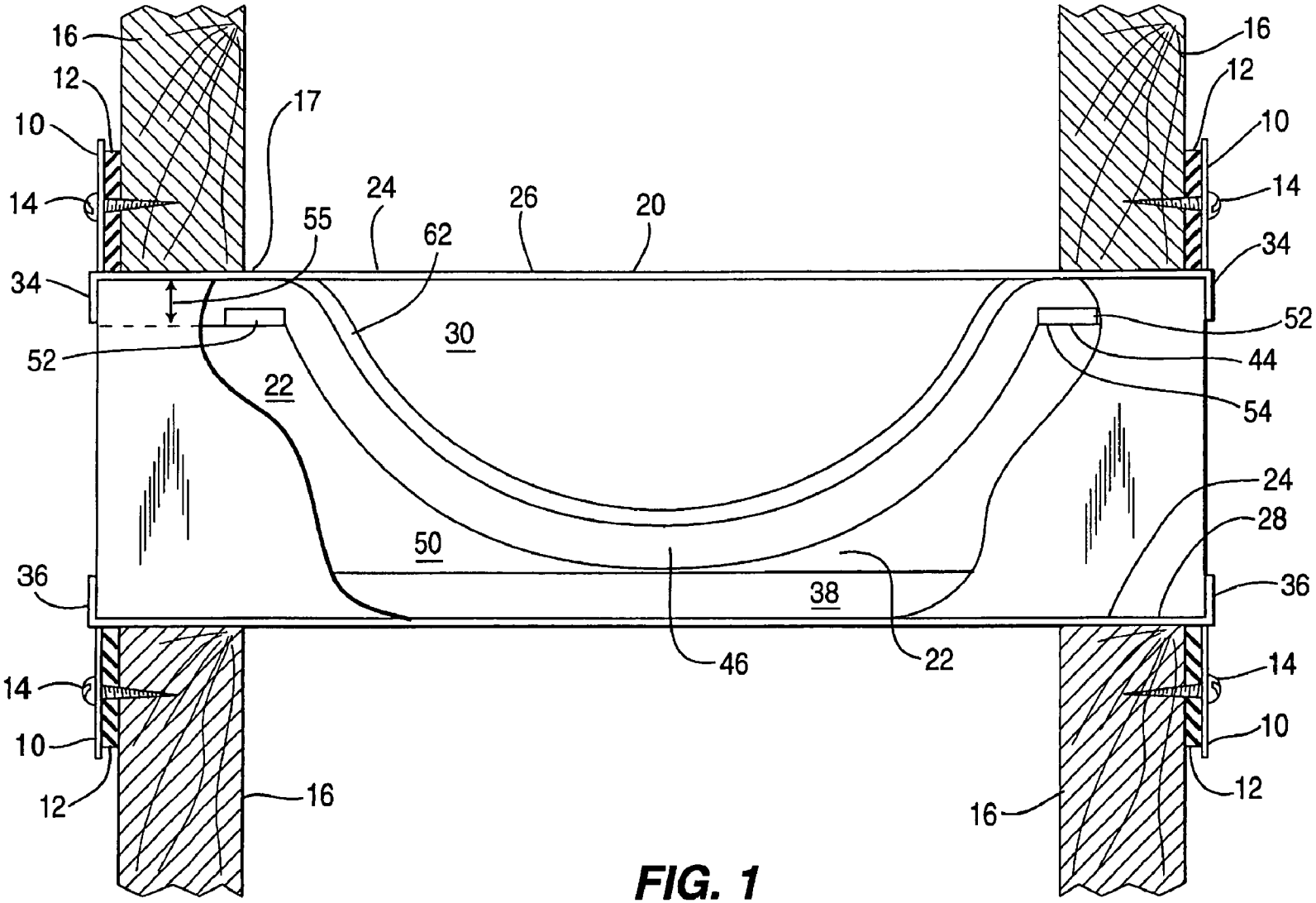
FIG. 1 is a side cross-sectional view of an embodiment of the intumescent firestopping apparatus of the present invention.
Figure 2:
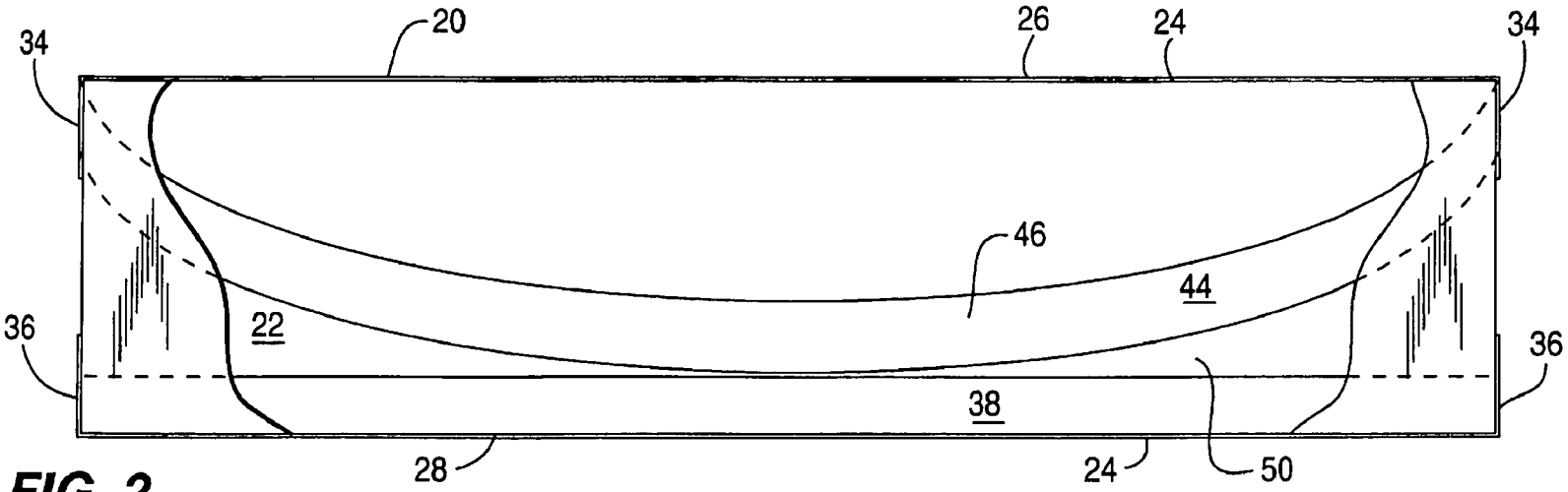
FIG. 2 is a side cross-sectional view of another embodiment of the intumescent firestopping apparatus of the present invention.
Figure 3:
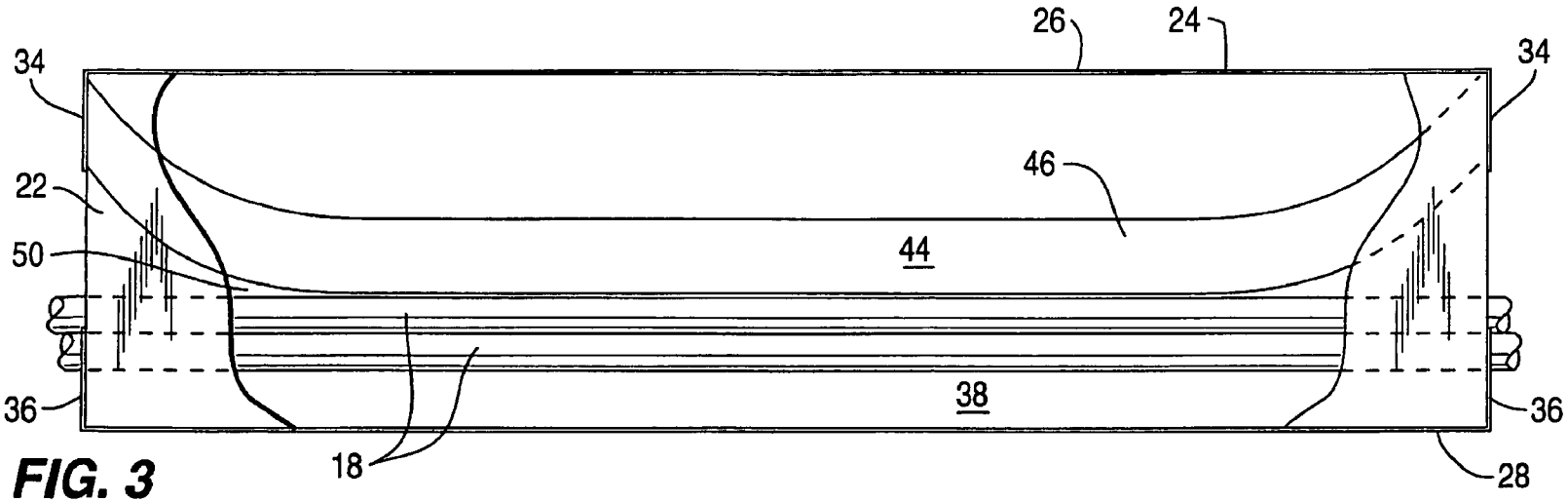
FIG. 3 is a side cross-sectional view of the embodiment of the intumescent firestopping apparatus shown in FIG. 2 illustrating the penetrating cables extending therethrough.

The intumescent firestopping apparatus of the present invention preferably includes a sleeve 20 which is adapted to be positioned extending through an opening 17 defined in a construction barrier 16 in standard residential or commercial construction. These openings 17 are defined in construction barriers 16 such as wall, floors and ceilings in order to allow cables or other penetrating members 18 to extend therethrough from room to room or from floor to floor. Normally the sleeve 20 is positioned within the opening 17 and a mounting plate 10 is placed surrounding the sleeve and attached to the sleeve such that it can be secured to the area of the construction barrier 16 immediately adjacent to the opening 17 therein by way of a securement means 14 such as a screw or the like. The sleeve can be detachably securable to the mounting plate 10 or it can be fixedly secured thereto allowing use in various different applications. Thus, the mounting plate 10 could be detachably securable to both the sleeve 20 and the construction barrier 16 if needed for usefulness in certain applications. Often it is preferably that an external gasket 12 will be positioned between the mounting plate 10 and the construction barrier 16 to facilitate sealing therebetween.

When so positioned sleeve 20 defines an access corridor 22 extending axially therethrough from one room to another or from one floor level to another through which penetrating members 18 such as cables can extend for communicating data or other transmission capabilities between vertically or horizontally adjacent working spaces.

Figure 4:
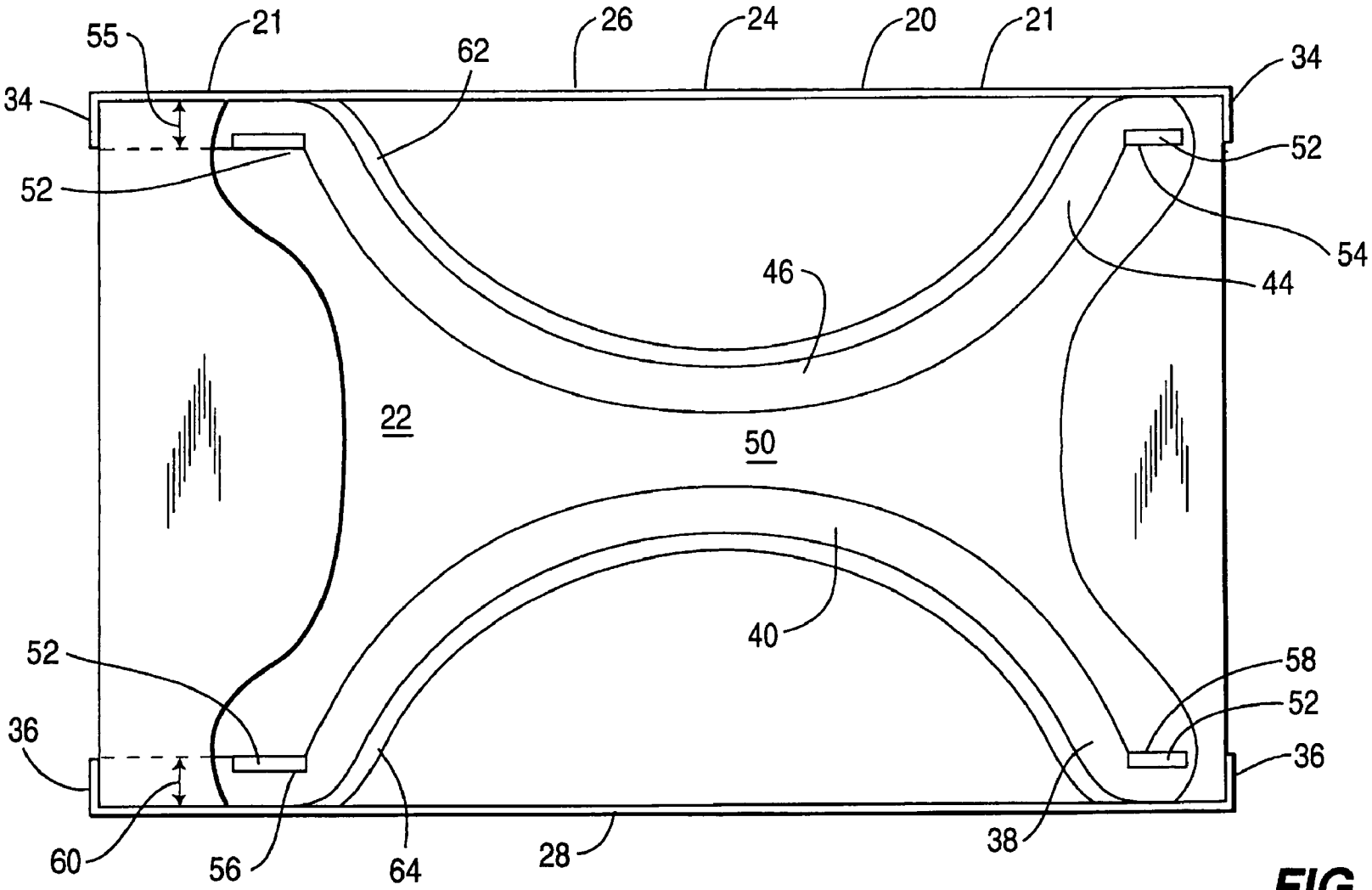
FIG. 4 is a side cross-sectional view of a further alternative embodiment of the present invention utilizing two pairs of restraining supports and two intumescent pads having flexible central sections with biasing means thereadjacent.
Figure 5:
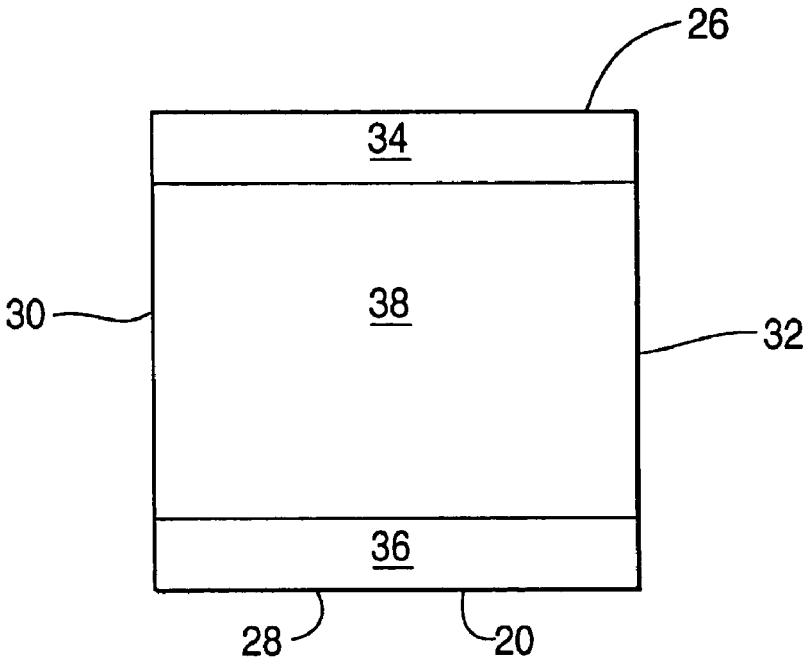
FIG. 5 is an end view of an embodiment of a sleeve of the present invention showing the intumescent pad extending between the upper and lower tabs.
Figure 6:
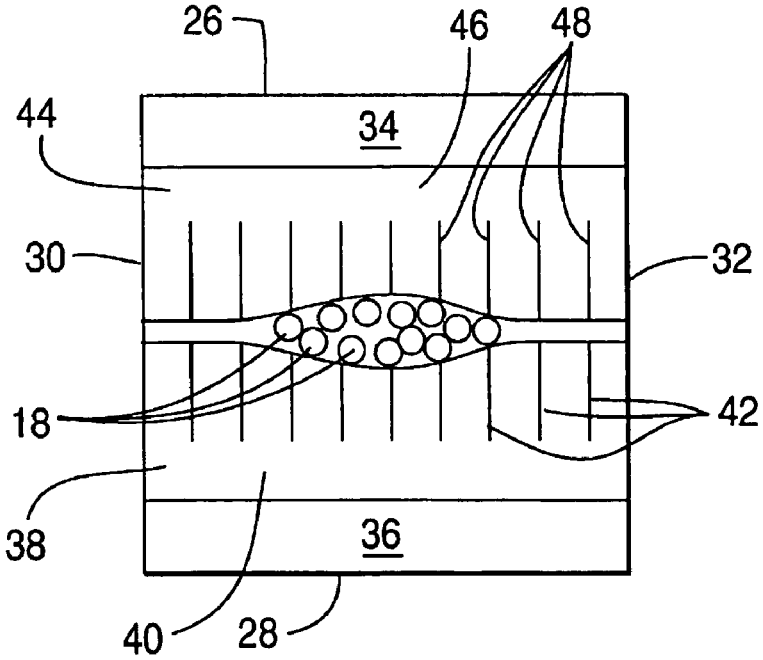
FIG. 6 is an illustration similar to FIG. 5 showing an alternative embodiment of the foam pads including a flexed upper central section and a flexed lower central section each of which defines multiple cuts or slots therein for enhancing the flexible resilience of the material and shows the penetrating cables extending therebetween.

In order to facilitate use of this design with existing structures having cables or other penetrating members 18 already in position extending through construction barriers 16, it is particularly advantageous to form sleeve 20 with a removable section 21 as shown best in FIG. 4. The removable section 21 can be located in either side wall 30 or 32 or can be in the lower wall 28 or the upper wall 26. FIG. 4 shows the removable section 21 as the entire upper wall member 26 which can be easily removed upwardly from the remaining portion of the sleeve to more easily place pre-existing penetrating members 18 extending therethrough. The removable section 21 could also comprise only a portion of one of the wall 30, 32, 34 or 36. The removable section is solely for the purpose of providing a means of installing the sleeve 20 of the present invention around penetrating members already in place extending through an existing wall, ceiling or floor.

In some applications the size of the openings 17 in the construction barriers 16 is so large that a single sleeve 20 will not successfully fill the entire opening. As such, with such larger openings 17 more than one separate individual sleeve 20 can be stacked vertically, horizontally or any other direction. This stacking is greatly enhanced by the inclusion of flat outer sections 24 on the outer portions of the sleeve 20.

Preferably the sleeve 20 will include an upper wall member 26 as well as a lower wall member 28 both of which extend completely through the openings 17 and are spaced apart from one another. Similarly a first side wall member 30 and a second side wall member 32 will also extend through the opening 17 and be spaced apart from one another. Preferably the first side wall member 30 and the second side wall member 32 will extend from the upper wall member 26 to the lower wall member 28 to facilitate defining of the access corridor 22 therebetween. Preferably the two side wall members 30 and 32 will be spaced apart and will be approximately parallel to each other and perpendicularly oriented with respect to the upper wall member 26 and the lower wall member 28 to further facilitate stacking and usage thereof.

The present invention will further include a lower intumescent pad 38 adapted to be positioned at least partially in abutment with the lower wall member 28 of the sleeve 20 of the present invention. This lower intumescent pad will preferably extend across the entire lower portion of the sleeve 20 in order to define the access corridor 22 thereabove and allow penetrating members such as cable 18 extending therethrough to rest upon the upper surface of the lower intumescent pad 38.

Also the present invention will include an upper intumescent pad means 44 positioned above the lower intumescent pad 38 and at least partially in contact with the upper wall member 26 of sleeve 20. The upper intumescent pad 44 preferably will be of a flexibly resilient material such as to facilitate flexing thereof downwardly. Preferably the upper intumescent pad 44 will include an upper central pad section 46 which will flex downwardly to a point adjacent to the upper surface of the lower intumescent pad 38 such as to define therebetween a confinement area 50 which will be adapted to receive and dynamically adjustably seal the cables 18 as they extend through the access corridor 22. To facilitate this downward flexible resilience the intumescent pad preferably will preferably include a foam base material.

The lower intumescent pad means 38 will preferably be held in place by a lower tab means 36 which will be positioned extending upwardly adjacent to the ends of the lower intumescent pad 38. The lower tab means 36 will extend upwardly preferably from the lower wall member 28. In a similar manner the upper wall member 26 will preferably define upper tab means 34 extending downwardly therefrom adjacent the ends of the upper intumescent pad 44 for the purpose of selectively facilitating retaining of the upper intumescent pad 44 in this position. Other means may be utilized for retaining the lower intumescent pad 38 and the upper intumescent pad 44 in place such as clips, adhesives or the like. However the use of the upper and lower tabs 34 and 36 has been found to be particularly advantageous.

The flexible resilience of the upper intumescent pad 44 and in particular the upper central pad section 46 can be significantly enhanced by the defining of a plurality of upper slots 48 extending longitudinally therealong. These slots 48 will facilitate the flexible resilience of the upper central pad central 46 of upper intumescent pad 44 in such a manner as to enhance the dynamic adjustable sealing of the throat area between the two intumescent pads which is designed for the purpose of retaining the cables 18 in position therebetween.

The resilient flexibility of the upper central pad section 46 extending in a lower direction is enhanced by the inclusion of first upper restraining supports 52 and second upper restraining supports 54. These supports are best shown in FIG. 1 and have the purpose of holding at least a portion of the upper intumescent pad 44 in position adjacent to the upper wall member 26 while allowing the upper central pad section 46 thereof to flex downwardly toward the lower intumescent pad 38 located therebelow. In this manner full intumescent capabilities will be maintained while providing a dynamically adjustable means for sealing and defining of a throat between the intumescent pads for receiving cables 18 extending therethrough. The first upper restraining support 52 and the second upper restraining support 54 will preferably define an upper restraining space 55 between these supports and the upper wall member 26 thereabove to facilitate retaining of the upper intumescent pad 44 therewithin. The restraining supports 52 and 54 can comprise tabs cut from the sleeve and projecting inwardly thereinto to provide supporting plates to facilitate holding of the pads in place as best shown in FIGS. 1 and 4.

To further enhance the downward flexible resilience of the upper central pad section 46 an upper biasing means such as upper flat spring means 62 may be included. This flat spring has the purpose of exerting a downwardly directed bias on the upper central pad section 46 of upper intumescent pad 44 to more firmly engage cables 18 which extend through the confinement area 50 for retaining them in place while at the same time maintaining full intumescent capability.

In a further alternative configuration the lower intumescent pad 38 can include a lower central pad section 40 which is flexibly resilient upwardly in a similar manner to the upper central pad section 46. This lower central pad section 40 can include a lower biasing means such as lower flat spring 64 for facilitating upward flexing thereof.

Furthermore the lower central pad section 40 can include a plurality of lower slot means 42 defined therein longitudinally to facilitate flexible resilience thereof and upward biasing toward the upper intumescent pad 44.

Further as shown best in FIG. 4 the lower intumescent pad 38 can be positioned within a lower restraining space 60 defined between the first lower restraining support 56 and the upper wall member 26 as well as defined between the second lower restraining support 58 and the upper wall member 26. Preferably the first lower restraining support 56 and the second lower restraining support 58 will be spaced apart from one another with the lower central pad section 40 and lower slot means 42, if included, defined thereon positioned between the restraining supports 56 and 58. In this manner the lower central pad section 40 can flex upwardly possibly in certain embodiments aided by the lower flat spring means 64 to facilitate engagement thereof with the upper intumescent pad means 44 thereabove and facilitate the defining of the confinement area 50 therebetween in a dynamically adjustable manner while maintaining the full intumescent capability for sealing thereof responsive to fire or heat.

It should be appreciated that the present invention has the sole purpose of providing a sleeve-like portal for the installation of cables for various purposes such as electrical, data, communication, signal, video cables or any other penetrating member through fire or smoke rated walls or other barriers. Such barriers require self-contained fire and/or smoke sealing mechanisms and the present invention provides a means for providing this while also providing the capability of dynamically adjusting to various cable loads.

The material for the sleeve 20 of the present invention preferably is chosen from steel or other non-combustible and/or non-melting material. It is preferably formed with a square or rectangular cross section to facilitate stacking as described above. The intumescent pads preferably include a foam component chosen of one of various polymers such as polyurethane or silicone or any other polymer which has the capability of forming a soft resilient foam. The intumescent component of the foam may include expandable graphite, sodium silicate or any other commonly used expansion ingredient which is compatible for use with the basic foam carrier construction.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. An intumescent firestopping apparatus for selectively sealing, responsive to fire, of an opening in a construction barrier having penetrating members extending therethrough comprising:

A. a sleeve means securable to the construction barrier at a position extending through the opening defined therein for defining an access corridor means extending completely through the barrier, said sleeve means including;
   (1) an upper wall member capable of extending completely through the barrier;
   (2) a lower wall member capable of extending completely through the barrier spatially disposed below said upper wall member to facilitate defining of said access corridor means therebetween;
   (3) a first side wall member capable of extending completely through the barrier and extending from said upper wall member downwardly to said lower wall member;
   (4) a second side wall member capable of extending completely through the barrier and extending from said upper wall member downwardly to said lower wall member at a position spatially disposed from said first side wall member to facilitate defining of said access corridor means therebetween;

B. a lower intumescent pad means positioned within said access corridor means extending at least partially along said lower wall member; and C. an upper intumescent pad means extending at least partially along said upper wall member, said upper intumescent pad means including an upper central pad section being flexibly resilient and extending downwardly from said upper wall means toward said lower intumescent pad means therebelow to define a confinement area therebetween capable for holding of penetrating members extending therethrough by exerting force thereon.

2. An intumescent firestopping apparatus for selectively sealing, responsive to fire, of an opening in a construction barrier having penetrating members extending therethrough as defined in claim 1 wherein said lower intumescent pad means extends along said lower wall member in abutment therewith along the complete length thereof.

3. An intumescent firestopping apparatus for selectively sealing, responsive to fire, of an opening in a construction barrier having penetrating members extending therethrough as defined in claim 1 wherein said lower intumescent pad means including a lower central pad section, which is flexibly resilient, extending upwardly from said lower wall means toward said upper intumescent pad means thereabove to define a confinement area therebetween for holding of penetrating members extending therethrough by exerting force thereon.

4. An intumescent firestopping apparatus for selectively sealing, responsive to fire, of an opening in a construction barrier having penetrating members extending therethrough as defined in claim 3 wherein said lower central pad section defines a lower slot means extending longitudinally therein to facilitate flexible resilience of said lower central pad section.

5. An intumescent firestopping apparatus for selectively sealing, responsive to fire, of an opening in a construction barrier having penetrating members extending therethrough as defined in claim 1 wherein said upper central pad section defines upper slot means extending longitudinally therein to facilitate flexible resilience of said upper central pad section.

6. An intumescent firestopping apparatus for selectively sealing, responsive to fire, of an opening in a construction barrier having penetrating members extending therethrough as defined in claim 1 further comprising an upper biasing means positioned between said upper wall member and said upper intumescent pad means to exert downwardly directed bias against said upper intumescent pad means to facilitate engagement thereof with respect to penetrating members extending through the opening for enhancing retaining thereof.

7. An intumescent firestopping apparatus for selectively sealing, responsive to fire, of an opening in a construction barrier having penetrating members extending therethrough as defined in claim 1 further comprising a lower biasing means positioned between said lower wall member and said lower intumescent pad means to exert upwardly directed bias against said lower intumescent pad means to facilitate engagement thereof with respect to penetrating members extending through the opening for enhancing retaining thereof.

8. An intumescent firestopping apparatus for selectively sealing, responsive to fire, of an opening in a construction barrier having penetrating members extending therethrough as defined in claim 1 wherein said sleeve means further includes upper tab means extending downwardly from said upper wall member to facilitate holding of said upper intumescent pad means in position adjacent said upper wall member.

9. An intumescent firestopping apparatus for selectively sealing, responsive to fire, of an opening in a construction barrier having penetrating members extending therethrough as defined in claim 1 wherein said sleeve means further includes lower tab means extending upwardly from said lower wall member to facilitate holding of said lower intumescent pad means in position adjacent said lower wall member.

10. An intumescent firestopping apparatus for selectively sealing, responsive to fire, of an opening in a construction barrier having penetrating members extending therethrough as defined in claim 1 further including a first upper restraining support means positioned extending laterally from said first side wall member and said second side wall member and a second upper restraining support means positioned extending laterally from said first side wall member and said second side wall member at a position spatially disposed from said first upper restraining support means, said first upper restraining support means and said second upper restraining support means being both spaced away from said upper wall member thereadjacent to define an upper restraining space therebetween to retain said upper intumescent pad means therewithin.

11. An intumescent firestopping apparatus for selectively sealing, responsive to fire, of an opening in a construction barrier having penetrating members extending therethrough as defined in claim 10 wherein said upper central pad section of said upper intumescent pad means is positioned between said first upper restraining support means and said second upper restraining support means to facilitate extending downwardly therebetween toward said lower intumescent pad means positioned therebelow.

12. An intumescent firestopping apparatus for selectively sealing, responsive to fire, of an opening in a construction barrier having penetrating members extending therethrough as defined in claim 3 further including a first lower restraining support means positioned extending laterally from said first side wall member and said second side wall member and a second lower restraining support means positioned extending laterally from said first side wall member and said second side wall member at a position spatially disposed from said first lower restraining support means, said first lower restraining support means and said second lower restraining support means being both spaced away from said lower wall member thereadjacent to define a lower restraining space therebetween to retain said lower intumescent pad means therewithin.

13. An intumescent firestopping apparatus for selectively sealing, responsive to fire, of an opening in a construction barrier having penetrating members extending therethrough as defined in claim 12 wherein said lower central pad section of said lower intumescent pad means is positioned between said first lower restraining support means and said second lower restraining support means to facilitate extending upwardly therebetween toward said upper intumescent pad means positioned thereabove.

14. An intumescent firestopping apparatus for selectively sealing, responsive to fire, of an opening in a construction barrier having penetrating members extending therethrough as defined in claim 1 wherein said sleeve means includes flat outer sections to facilitate placing of a plurality of sleeve means adjacent one another to facilitate usage with openings in construction barriers which are larger than a single of said sleeve means.

15. An intumescent firestopping apparatus for selectively sealing, responsive to fire, of an opening in a construction barrier having penetrating members extending therethrough as defined in claim 1 wherein said sleeve means is rectangular with said upper wall member and said lower wall member being oriented parallel with respect to one another and with said first side wall member and said second side wall member being oriented parallel with respect to one another and perpendicularly with respect to said upper wall member and said lower wall member.

16. An intumescent firestopping apparatus for selectively sealing, responsive to fire, of an opening in a construction barrier having penetrating members extending therethrough as defined in claim 1 wherein said sleeve means is square.

17. An intumescent firestopping apparatus for selectively sealing, responsive to fire, of an opening in a construction barrier having penetrating members extending therethrough as defined in claim 1 wherein said upper intumescent pad means and said lower intumescent pad means have sufficient intumescent expansion capability to seal said access corridor means completely.

18. An intumescent firestopping apparatus for selectively sealing, responsive to fire, of an opening in a construction barrier having penetrating members extending therethrough as defined in claim 1 wherein said lower intumescent pad means and said upper intumescent pad means comprises compressible foam material to conform to the opening for sealing thereof.

19. An intumescent firestopping apparatus for selectively sealing, responsive to fire, of an opening in a construction barrier having penetrating members extending therethrough as defined in claim 1 wherein said upper intumescent pad means and said lower intumescent pad means include foam components.

20. An intumescent firestopping apparatus for selectively sealing, responsive to fire, of an opening in a construction barrier having penetrating members extending therethrough as defined in claim 19 wherein said foam components are chosen from various foams including polyurethane, silicone and other polymers.

21. An intumescent firestopping apparatus for selectively sealing, responsive to fire, of an opening in a construction barrier having penetrating members extending therethrough as defined in claim 1 wherein said upper intumescent pad means and said lower intumescent pad means includes intumescent components chosen from expandable graphite and sodium silicate.

22. An intumescent firestopping apparatus for selectively sealing, responsive to fire, of an opening in a construction barrier having penetrating members extending therethrough comprising:

A. a sleeve means securable to the construction barrier at a position extending through the opening defined therein for defining an access corridor means extending completely through the barrier, said sleeve means including flat outer sections to facilitate placing of a plurality of sleeve means adjacent one another to facilitate usage with openings in construction barriers which are larger than a single of said sleeve means, said sleeve means including;

(1) an upper wall member capable of extending completely through the barrier;

(2) a lower wall member capable of extending completely through the barrier spatially disposed below said upper wall member to facilitate defining of said access corridor means therebetween;

(3) a first side wall member capable of extending completely through the barrier and extending from said upper wall member downwardly to said lower wall member;

(4) a second side wall member capable of extending completely through the barrier and extending from said upper wall member downwardly to said lower wall member at a position spatially disposed from said first side wall member to facilitate defining of said access corridor means therebetween, said sleeve means being rectangular with said upper wall member and said lower wall member being oriented parallel with respect to one another and with said first side wall member and said second side wall member being oriented parallel with respect to one another and perpendicularly with respect to said upper wall member and said lower wall member;

(5) an upper tab means extending downwardly from said upper wall member;

(6) an lower tab means extending upwardly from said lower wall member;

B. a lower intumescent pad means positioned within said access corridor means extending at least partially along said lower wall member, said lower intumescent pad means being in abutment with respect to said lower tab means to facilitate attachment thereof with respect to said sleeve means;

C. an upper intumescent pad means extending at least partially along said upper wall member, said upper intumescent pad means including an upper central pad section being flexibly resilient and extending downwardly from said upper wall means toward said lower intumescent pad means therebelow to define a confinement area therebetween capable for holding of penetrating members extending therethrough by exerting force thereon, said upper intumescent pad means being in abutment with respect to said upper tab means to facilitate attachment thereof with respect to said sleeve means, said upper intumescent pad means and said lower intumescent pad means having sufficient intumescent expansion capability to seal said access corridor means completely;

D. a first upper restraining support means positioned extending laterally from said first side wall member and said second side wall member; and E. a second upper restraining support means positioned extending laterally from said first side wall member and said second side wall member at a position spatially disposed from said first upper restraining support means, said first upper restraining support means and said second upper restraining support means being both spaced away from said upper wall member to define an upper restraining space therebetween to retain said upper intumescent pad means therewithin, said upper central pad section of said upper intumescent pad means being positioned between said first upper restraining support means and said second upper restraining support means to facilitate extending downwardly therebetween toward said lower intumescent pad means positioned therebelow.

23. An intumescent firestopping apparatus for selectively sealing, responsive to fire, of an opening in a construction barrier having penetrating members extending therethrough comprising:

A. a sleeve means securable to the construction barrier at a position extending through the opening defined therein for defining an access corridor means extending completely through the barrier, said sleeve means including flat outer sections to facilitate placing of a plurality of sleeve means adjacent one another to facilitate usage with openings in construction barriers which are larger than a single of said sleeve means, said sleeve means including;

(1) an upper wall member capable of extending completely through the barrier;

(2) a lower wall member capable of extending completely through the barrier spatially disposed below said upper wall member to facilitate defining of said access corridor means therebetween;

(3) a first side wall member capable of extending completely through the barrier and extending from said upper wall member downwardly to said lower wall member;

(4) a second side wall member capable of extending completely through the barrier and extending from said upper wall member downwardly to said lower wall member at a position spatially disposed from said first side wall member to facilitate defining of said access corridor means therebetween, said sleeve means being rectangular with said upper wall member and said lower wall member being oriented parallel with respect to one another and with said first side wall member and said second side wall member being oriented parallel with respect to one another and perpendicularly with respect to said upper wall member and said lower wall member;

(5) an upper tab means extending downwardly from said upper wall member;

(6) an lower tab means extending upwardly from said lower wall member;

B. a lower intumescent pad means positioned within said access corridor means extending at least partially along said lower wall member, said lower intumescent pad means being in abutment with respect to said lower tab means to facilitate attachment thereof with respect to said sleeve means, said lower intumescent pad means including a lower central pad section, which is flexibly resilient, extending upwardly from said lower wall means, said lower central pad section defining a lower slot means extending longitudinally therein to facilitate flexible resilience thereof;

C. an upper intumescent pad means extending at least partially along said upper wall member, said upper intumescent pad means including an upper central pad section being flexibly resilient and extending downwardly from said upper wall means toward said lower central pad section of said lower intumescent pad means therebelow to define a confinement area therebetween capable for holding of penetrating members extending therethrough by exerting force thereon, said upper central pad section defining an upper slot means extending longitudinally therein to facilitate flexible resilience of said upper central pad section, said upper intumescent pad means being in abutment with respect to said upper tab means to facilitate attachment thereof with respect to said sleeve means, said upper intumescent pad means and said lower intumescent pad means having sufficient intumescent expansion capability to seal said access corridor means completely;

D. a first upper restraining support means positioned extending laterally from said first side wall member and said second side wall member;

E. a second upper restraining support means positioned extending laterally from said first side wall member and said second side wall member at a position spatially disposed from said first upper restraining support means, said first upper restraining support means and said second upper restraining support means being both spaced away from said upper wall member to define an upper restraining space therebetween to retain said upper intumescent pad means therewithin, said upper central pad section of said upper intumescent pad means being positioned between said first upper restraining support means and said second upper restraining support means to facilitate extending downwardly therebetween toward said lower intumescent pad means positioned therebelow;

F. a first lower restraining support means positioned extending laterally from said first side wall member and said second side wall member;

G. a second lower restraining support means positioned extending laterally from said first side wall member and said second side wall member at a position spatially disposed from said first lower restraining support means, said first lower restraining support means and said second lower restraining support means being both spaced away from said lower wall member thereadjacent to define a lower restraining space therebetween to retain said lower intumescent pad means therewithin, said lower central pad section of said lower intumescent pad means being positioned between said first lower restraining support means and said second lower restraining support means to facilitate extending upwardly therebetween toward said upper intumescent pad means positioned thereabove;

H. an upper flat spring means positioned between said first upper restraining support means and said second upper restraining support means and also positioned between said upper wall member and said upper intumescent pad means to exert downwardly directed bias against said upper intumescent pad means to facilitate engagement thereof with respect to penetrating members extending through the opening for enhancing retaining thereof; and I. a lower flat spring means positioned between said first lower restraining support means and said second lower restraining support means and also positioned between said lower wall member and said lower intumescent pad means to exert upwardly directed bias against said lower intumescent pad means to facilitate engagement thereof with respect to penetrating members extending through the opening for enhancing retaining thereof.

*24. An apparatus comprising:*

*a sleeve adapted to be positioned so as to pass through a construction barrier, said sleeve defining an access corridor extending longitudinally through the construction barrier adapted to receive a penetrating member extending therethrough, said sleeve defining a first opening and a second opening spatially disposed from one another with said access corridor extending therebetween to facilitating passing of a penetrating member extending therethrough,*

*first and second intumescent pads located within said access corridor and extending along the entire length of said access corridor from said first opening to said second opening, said first intumescent pad being held adjacent said sleeve at a position immediately adjacent said first opening and also being held adjacent said sleeve at a positioned immediately adjacent said second opening and extending longitudinally along said access corridor therebetween, said second intumescent pad being held adjacent said sleeve at a position immediately adjacent said first opening spatially disposed from said first intumescent pad and also being held adjacent said sleeve at a position immediately adjacent said second opening spatially disposed from said first intumescent pad and extending longitudinally along said access corridor therebetween,*

*at least one of said first or second intumescent pads having a flexible pad section that is arched and has an arcuate shape located thereon spatially disposed from said first opening and said second opening of said sleeve which includes a convex shaped surface adapted to abut penetrating members extending through said access corridor and through said first opening and said second opening, said convex shaped surface presenting a linear contour when viewed in a cross-section in a direction extending longitudinally and parallel with respect to said access corridor, said convex shape surface also presenting a convex contour when viewed in a cross-section in a direction oriented laterally and perpendicularly with respect to said access corridor, said flexible pad section being positioned facing in a direction toward another of the intumescent pads to create a confinement area therebetween for creating a seal against a penetrating member passing through the confinement area in response to heat.*

*25. The apparatus as defined in claim 24 wherein the at least one of said first or second intumescent pads has sufficient flexibility to flex toward the other intumescent pad to a point adjacent the other of the intumescent pads.*

*26. An apparatus comprising:*

*a sleeve adapted to be positioned so as to pass through a construction barrier, said sleeve defining an access corridor extending longitudinally through the construction barrier adapted to receive a penetrating member extending therethrough, said sleeve defining a first opening and a second opening spatially disposed from one another with said access corridor extending therebetween to facilitating passing of a penetrating member extending therethrough,*

*first and second intumescent pads located within said access corridor and extending along the entire length of*

*said access corridor from said first opening to said second opening, said first intumescent pad being held adjacent said sleeve at a position immediately adjacent said first opening and also being held adjacent said sleeve at a positioned immediately adjacent said second opening and extending longitudinally along said access corridor therebetween, said second intumescent pad being held adjacent said sleeve at a position immediately adjacent said first opening spatially disposed from said first intumescent pad and also being held adjacent said sleeve at a position immediately adjacent said second opening spatially disposed from said first intumescent pad and extending longitudinally along said access corridor therebetween*

*at least one of said first or second intumescent pads having external ends fixed with respect to the sleeve and a flexible pad section that is arched and has an arcuate shape located thereon spatially disposed from said first opening and said second opening of said sleeve which includes a convex shaped surface adapted to abut penetrating members extending through said access corridor and through said first opening and said second opening, said convex shaped surface presenting a linear contour when viewed in a cross-section in a direction extending longitudinally and parallel with respect to said access corridor, said convex shape surface also presenting a convex contour when viewed in a cross-section in a direction oriented laterally and perpendicularly with respect to said access corridor, said flexible pad section being positioned facing in the direction of and arching toward the other of the intumescent pads to create a confinement area therebetween for creating a seal against a penetrating member passing through the confinement area in response to heat and wherein the at least one of the first or second intumescent pads has a flexible pad section having at least one longitudinal slot formed therein to facilitate the flexible resilience of the flexible pad section.*

*27. The apparatus as defined in claim 26 wherein the at least one of the first or second intumescent pads has a flexible pad section having a plurality of individual longitudinal slots formed therein to facilitate the flexible resilience of the flexible pad section.*

*28. The apparatus as defined in claim 24 wherein said sleeve is constructed having oppositely positioned generally flat outer walls.*

*29. The apparatus as defined in claim 28 wherein said opposite outer walls each have a restraining means to retain at least one of said first or second intumescent pads in a secure position within said sleeve while allowing a portion thereof to flex toward the other of the intumescent pads.*

*30. The apparatus as defined in claim 28 wherein said opposite outer walls each has a securing means that at least partially encloses exterior ends of at least one of said first or second intumescent pads.*

*31. An apparatus comprising:*

*a sleeve adapted to be positioned so as to pass through a construction barrier, said sleeve defining an access corridor through the construction barrier adapted to receive a penetrating member extending therethrough, said sleeve having opposite generally flat outer walls, said sleeve defining a first opening and a second opening spatially disposed from one another with said access corridor extending therebetween to facilitating passing of a penetrating member extending therethrough,*

*first and second intumescent pads located within said access corridor and extending along the entire length of said access corridor from said first opening to said second opening, said first intumescent pad being held adjacent said sleeve at a position immediately adjacent said first opening and also being held adjacent said sleeve at a positioned immediately adjacent said second opening and extending longitudinally along said access corridor therebetween, said second intumescent pad being held adjacent said sleeve at a position immediately adjacent said first opening spatially disposed from said first intumescent pad and also being held adjacent said sleeve at a position immediately adjacent said second opening spatially disposed from said first intumescent pad and extending longitudinally along said access corridor therebetween,*

*at least one of said first or second intumescent pads having a flexible pad section that is arched and has an arcuate shape located thereon spatially disposed from said first opening and said second opening of said sleeve which includes a convex shaped surface adapted to abut penetrating members extending through said access corridor, said convex shaped surface presenting a linear contour when viewed in a cross-section in a direction extending longitudinally and parallel with respect to said access corridor, said convex shape surface also presenting a convex contour when viewed in a cross-section in a direction oriented laterally and perpendicularly with respect to said access corridor, said flexible pad section being positioned facing in the direction that extends toward another of the intumescent pads to create a confinement area therebetween for creating a seal against a penetrating member passing through the confinement area in response to heat, each of said opposite outer walls having a securing means that at least partially encloses external ends of at least one of said first or second intumescent pads wherein said securing means comprises a tab extending from said opposite outer walls.*

*32. The apparatus as defined in claim 28 wherein at least a portion of one of said walls is removable.*

*33. The apparatus as defined in claim 32 wherein at least one of said walls is entirely removable.*

*34. The apparatus as defined in claim 24 wherein both of said first and second intumescent pads have flexible pad sections.*

*35. The apparatus as defined in claim 34 wherein said flexible pad sections of said first and second intumescent pads are disposed opposite one another.*

*36. An apparatus comprising:*

*a sleeve adapted to be positioned so as to pass through a construction barrier,*

*said sleeve providing an access corridor through the construction barrier adapted to receive a penetrating member extending therethrough, said sleeve defining a first opening and a second opening spatially disposed from one another with said access corridor extending therebetween to facilitating passing of a penetrating member extending therethrough,*

*first and second intumescent pads located within said access corridor and extending along the entire length of said access corridor from said first opening to said second opening, said first intumescent pad being held adjacent said sleeve at a position immediately adjacent said first opening and also being held adjacent said sleeve at a positioned immediately adjacent said second opening and extending longitudinally along said access corridor therebetween, said second intumescent pad being held adjacent said sleeve at a position immediately adjacent*

*said first opening spatially disposed from said first intumescent pad and also being held adjacent said sleeve at a position immediately adjacent said second opening spatially disposed from said first intumescent pad and extending longitudinally along said access corridor therebetween,*

*at least one of said first or second intumescent pads having a flexible pad section that is arched and has an arcuate shape located thereon spatially disposed from said first opening and said second opening of said sleeve which includes a convex shaped surface adapted to abut penetrating members extending through said access corridor and through said first opening and said second opening, said convex shaped surface presenting a linear contour when viewed in a cross-section in a direction extending longitudinally and parallel with respect to said access corridor, said convex shape surface also presenting a convex contour when viewed in a cross-section in a direction oriented laterally and perpendicularly with respect to said access corridor, said flexible pad section being positioned facing in the direction that extends toward the other of the intumescent pads to create a confinement area therebetween for creating a seal against a penetrating member passing through the confinement area in response to heat wherein a flat spring means is affixed to the at least one of said first or second intumescent pads having a flexible pad section for enhancing flexible resilience thereof toward a penetrating member passing through said access corridor.*

* * * * *